United States Patent [19]
Crawford

[11] 3,777,405
[45] Dec. 11, 1973

[54] DRILLING MUD RECLAIMING APPARATUS

[76] Inventor: Thomas B. Crawford, Box L, Simonton, Tex. 77476

[22] Filed: Apr. 17, 1972

[21] Appl. No.: 244,625

[52] U.S. Cl..................... 34/57 R, 34/57 A, 175/66
[51] Int. Cl............................................. F26b 17/10
[58] Field of Search.................... 34/10, 57 R, 57 A; 175/66, 206

[56] References Cited
UNITED STATES PATENTS

| | | | |
|---|---|---|---|
| 2,659,587 | 11/1953 | Bowen | 34/57 A X |
| 3,212,197 | 10/1965 | Crawford | 34/57 A X |
| 3,295,221 | 1/1967 | Joy | 34/57 A X |
| 3,401,465 | 9/1968 | Larwill | 34/57 A |
| 3,250,017 | 5/1966 | Coulter et al. | 34/10 |

Primary Examiner—William F. O'Dea
Assistant Examiner—William C. Anderson
Attorney—Donald Gunn et al.

[57] ABSTRACT

An apparatus for reclaiming drilling mud from a drilling site which incorporates a movable vehicle which carries a forced air furnace which heats a substantial amount of air to an elevated temperature. A fluidized bed dryer is arranged so that hot air passes through the fluid bed heating the bed. The drilling mud is delivered through a suitable pump to a spray system above the bed and is sprayed on the bed. This drives off the water in the drilling mud. The drilling mud is withdrawn from one end of the fluid bed through a sacking mechanism and is bagged. The air flowing from the fluid bed is withdrawn and forced through a cyclone centrifuge, dropping out the dust and the air and water vapor are vented to atmosphere.

8 Claims, 6 Drawing Figures

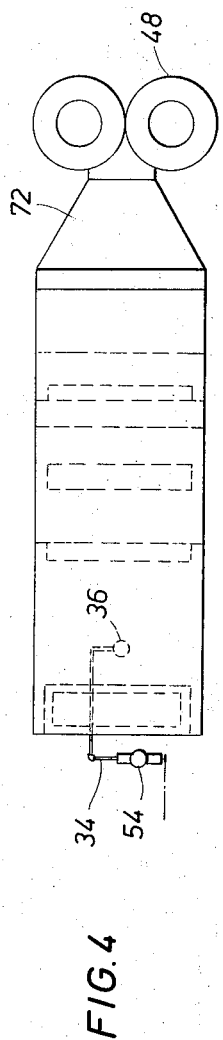
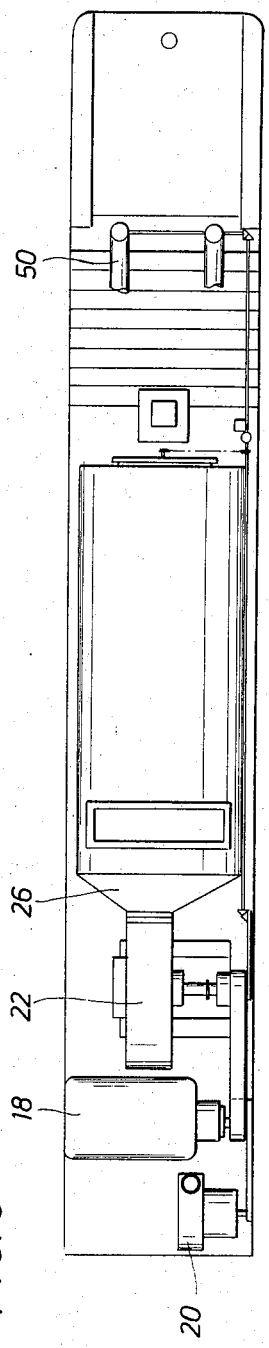
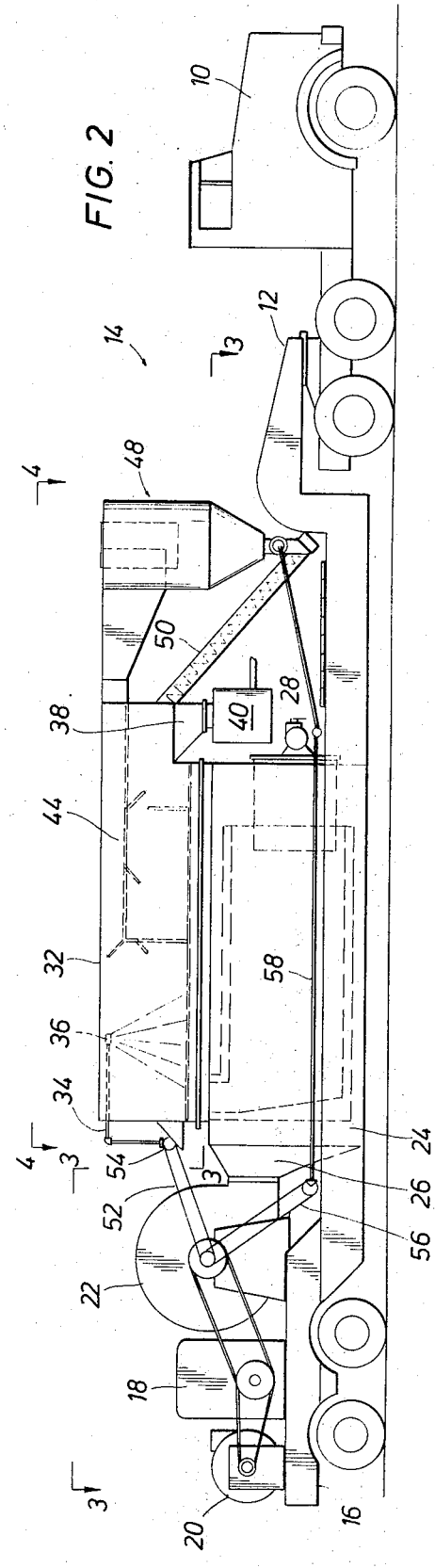
FIG. 4
FIG. 3
FIG. 2

DRILLING MUD RECLAIMING APPARATUS

BACKGROUND OF THE INVENTION

In the drilling of an oil well, drilling mud is a vital component of the drilling system. Drilling mud serves not only as a lubricant for the drill bit, but it also serves as a means of removing the cuttings from the drill bit and carries the cuttings to the surface as the mud circulates in the well. The mud also prevents lateral flow from the well. The mud serves as a blowout preventer in that the weight of the column of mud in the well reduces the dangers which arise when the drill bit enters a formation under high pressure. As will be understood by all those familiar with drilling techniques, drilling mud is essential in the drilling of an oil well.

Typically, oil wells are drilled in remote or rural locations. The mud constituents, typically in dry form and sacked or bagged, are transported to the location and water is added. The mud is normally mixed at the drilling site by a drilling mud service company and is furnished to the well from a reserve pit which is normally an open pit adjacent to the well site. Normally, several thousand gallons of mud are used in the drilling of an oil well and indeed, the mud pits may contain several thousand gallons of mud even when the well is finished.

When a well is drilled into a producing formation, typically the mud can be reused because subsequent wells will be drilled fairly close by. The drilling rig may be skidded a few hundred yards and a subsequent well will be drilled thus offering an opportunity to reuse the mud nearby. In the case of drilling a wildcat, the mud is often left at the drilling site and must be disposed of in some acceptable manner. This occurs because there is no other nearby well.

Drilling mud has substantial economic value. Its value is sufficiently great that in some instances, it is possible to send a tank truck to collect the mud and to haul it from the drilling site to a collection point. However, even this possibility is measurably limited and is not very economical.

The present invention provides a means whereby drilling mud can be reclaimed. The apparatus of the present invention is a drilling mud reclaiming device, preferably mounted on a flat bed trailer or skid mounted, enabling it to be hauled to a remote drilling site on land, or in a marsh, or at sea. The apparatus is preferably hauled to the drilling site and mud is taken from the mud pit by means of a pump and pumped to the mud reclaiming apparatus. The apparatus removes the water enabling the remaining dry ingredients to be sacked for easy transportation. Not only does this permit recovery of substantial financial values, but the apparatus further serves as a means for reducing pollution. This latter point is quite significant in view of the concern for pollution of streams and rivers. Quite often, mud pits are simply left at an abandoned drilling site with the mud in the pits and subsequent rains fill the pits, overflowing the mud which then runs off in nearby streams and rivers. Inasmuch as drilling mud includes barites and many other chemical constituents, the damage to the streams can be quite measurable. At offshore locations, it is not wise to dump the mud in the waters near the drilling site because of the pollution caused by the mud.

SUMMARY OF THE INVENTION

The present invention is therefore summarized as incorporating a trailer or skid mounted forced air furnace. The furnace forms a large draft of heated air which is then directed through a fluid bed. The fluid bed is heated by the air which flows upwardly through the fluid bed. The heated air warms the fluid bed to a temperature sufficient to evaporate water from the drilling mud. The mud is forced through a spray system and is sprayed from above onto the fluid bed. The water is vaporized when it is sprayed into the hot air or when it is heated by the fluid bed, leaving only the dry ingredients of the drilling mud. The dry ingredients are removed from one end of the fluid bed heat exchanger and are bagged or sacked.

DESCRIPTION OF THE DRAWINGS

FIG. 2 is a side view of the trailer mounted apparatus shown in FIG. 1;

FIG. 3 is a plan view, partly in section along the line 3 — 3 of FIG. 2, illustrating details of construction and arrangement of the mud recovery apparatus;

FIG. 4 is a sectional view taken along the line 4 — 4 of FIG. 2 illustrating the top side of the fluid bed heat exchanger and a dust remover connected to the outlet thereof;

DESCRIPTION OF THE PREFERRED EMBODIMENT

Attention is first directed to FIG. 2 of the drawings where a tractor 10 is shown connected to a trailer 12 on which the present invention is mounted. The apparatus is generally indicated by the numeral 14 but will be understood to normally include the truck trailer 12 or some other movable platform. The various components will be described which are mounted on the truck trailer 12 after which their cooperative operation will be set forth.

Figure 1:
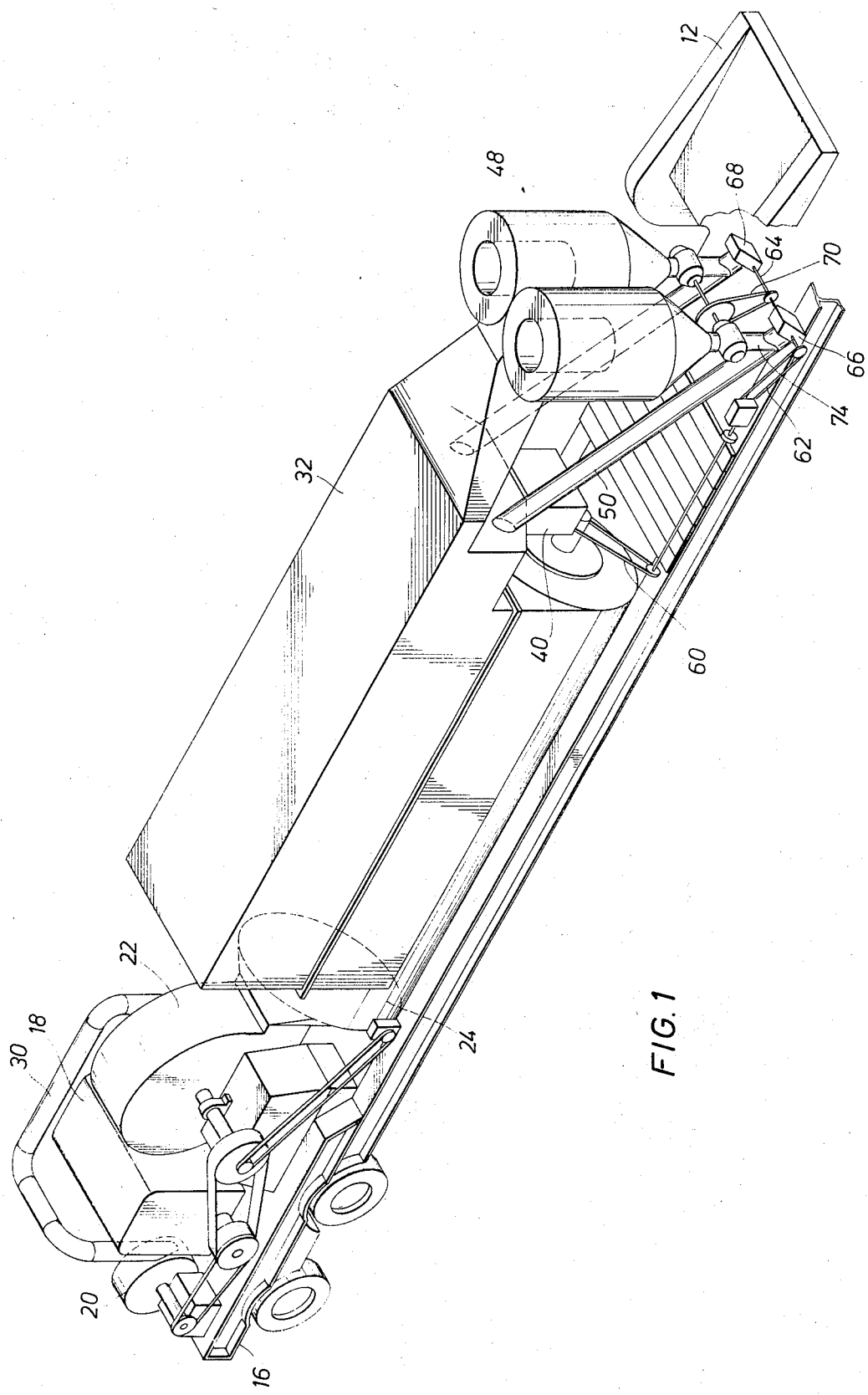
FIG. 1 is a perspective view of the trailer mounted mud recovery apparatus of the present invention showing the arrangement of the various components of the mud recovery apparatus.

The trailer 12 has a rear platform 16 which is elevated and which supports substantial equipment. The elevated platform 16 supports a power plant 18 which can be a diesel power plant or the like. It is connected by means of a belt or chain drive to a first blower 20. The blower 20 is mounted adjacent to the power plant 18. A larger blower 22 is driven by the power plant 18. As shown in the drawings, suitable belt drives are connected to the blowers 20 and 22. The numeral 24 identifies a forced air furnace. The forced air furnace is connected by means of a duct 26 to the blower 22. The blower 22 forces a substantial stream of air into the furnace 24 which heats the air for purposes to be described. The furnace 24 includes a burner manifold 28 at the right hand end. The manifold 28 mixes the air moved by the blower 20 and a suitable fuel for consumption in the furnace 24. As is shown in FIG. 1, a pipe 30 extends from the blower 20 along the side of the truck to the manifold 28 where the air is mixed with a suitable fuel. The furnace will be described in greater detail hereinafter in conjunction with the heater element.

Referring to FIG. 2, the furnace 24 is mounted just below a fluid bed dryer 32. The dryer 32 is a closed chamber. The mud is forced through a conduit 34 into the chamber at a spray nozzle 36. The mud is sprayed into the fluid bed dryer. The fluid bed chamber is divided into several portions as will be described hereinafter. The dried mud is carried off the fluid bed at one end and is directed downwardly through a funnel 38 into a bagging apparatus 40 where the dried, powder like ingredients are bagged or sacked for easy handling.

The fluid bed dryer 32 has a substantial volume of air forced into it from the furnace 24 just below. The air flows through the furnace and into the fluid bed dryer 32. It is exhausted from the dryer 32 through a passage 44 into a cyclone separator means 48. The air and water vapors are centrifugally separated from the heavier dust particles carried in the air with the air and water vapor being vented upwardly and the heavier dust particles being allowed to fall by gravity to the bottom of the cyclone separator 48. The cyclone separator collects the dust at the bottom and returns it by means of a screw conveyor 50 to the dryer chamber 32. The screw conveyor returns just above the funnel 38 so that the mud dust is returned for sacking.

As shown in FIG. 2, the power plant 18 preferably functions as the principal source of power. A belt drive 52 is connected to a pump 54 (FIG. 4) which is in the mud line 34. Preferably the mud line 34 is connected through a flexible hose (not shown) which extends to the mud pit. One end of the hose is submerged in the mud pit and a suitable vacuum pump (not shown) is used to draw the mud into the hose or line and the mud is pumped through the hose or line to the apparatus 14. The mud recovery apparatus 14 thus delivers the mud through the pipe 34 at the urging of a pump 54 and the mud is forced through a spray nozzle 36 positioned above the top of the fluid bed dryer 32. As will be understood, more than one spray nozzle can be used in the dryer chamber 32.

Referring again to FIG. 2 of the drawings, the numeral 56 identifies a flexible belt or chain drive which is connected to a shaft 58. The shaft 58 is a power take off shaft which connects to other portions of the equipment. For instance, the shaft 58 extends along the length of the truck trailer 12. It is shown in FIG. 1 connected by means of a flexible belt drive 60 which supplies motive power to the manifold 28. Preferably, the flexible drive 60 operates a fan which mixes the air and fuel to be consumed in the furnace 24. Referring again to FIG. 2, the burner mechanism 28 is supplied with a substantial flow of air from the air blower 20. In addition, a fuel line (not shown) is connected to the burner 28 and supplies a suitable quantity of fuel. Many fuels can be used but among others, suitable fuels include butane, propane, other LPG gases or fuel oil. The fuel and air mixture is forced into the burner mechanism as will be described with respect to FIG. 5 and to this end, the power take off shaft 58 provides power through the flexible drive 60 for driving a rotor or fan which achieves a more intimate mixing at the burner manifold 28.

Attention is next directed to FIG. 1 where the power take off shaft 58 is connected to a flexible drive 62 which rotates a transversely extending shaft 64. The shaft 64 is connected through a pair of gear boxes 66 and 68. The gear boxes are identical in construction and in function. The gear boxes are located at the bottom end of the conveyor means 50. It will be observed that the screw conveyor means 50 are duplicated on two sides of the apparatus. The screw conveyor means are preferably formed of a large pipe which has a screw type conveyor arranged therein and extending along the length of the hollow pipe. In other words, a large auger is positioned in the tube or pipe. The gear boxes 66 and 68 are connected to the auger or screw and rotate the auger or screw so that dry materials are carried upwardly along the screw conveyor.

A flexible drive 70 extends from the transverse shaft 64 and supplies power to each of a pair of cyclone separator air locks. Cyclone separators are devices in which a fan forces a centrifugal draft within the outer chamber to flow, drawing in the fluids or vapors to be separated, and whirling them about at a rapid speed. The cyclone separators are provided with the exhaust air flowing from the fluid bed dryer by means of a duct 72 (see FIG. 4) which is connected tangentally to both of the cyclone separators. As shown in FIG. 4, the duct 72 conveys the exhaust air and water vapor from the fluid bed dryer to the cyclone separators where the dust is separated and centrifuged to the bottom and the air and water vapor are expelled through the top. The cyclone separators are driven by the flexible drive 70 which is connected to the power shafts of the cyclone separators as a means of power. The cyclone separators collect the dust at the bottom, and the dust is conveyed through a downwardly extending tubular member 74 into the top of the hollow member defining the screw conveyor, and the screw conveyor returns the dust to the dryer chamber 32 for packaging.

Figure 5:
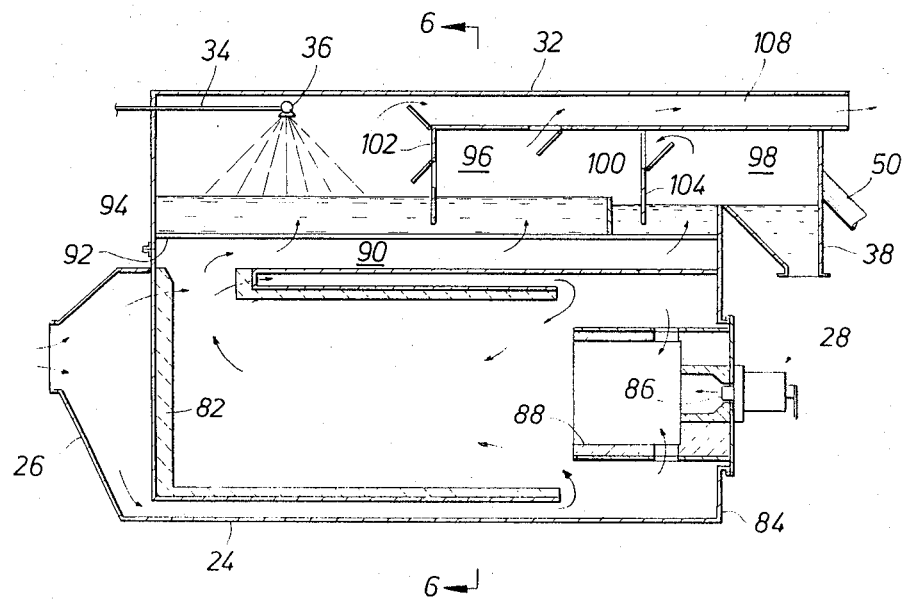
FIG. 5 is a sectional view taken through the hot air furnace and fluid bed dryer illustrating the direction of flow of the heated air and the water vapors which are driven off from the drilling mud.

Attention is next directed to FIG. 5 for a more detailed explanation of the flow of the heated air and the handling of the liquid mud. The structure illustrated in FIG. 5 will be described in detail sufficient to convey an understanding of how the liquid mud is dried and a powder is recovered.

Figure 6:
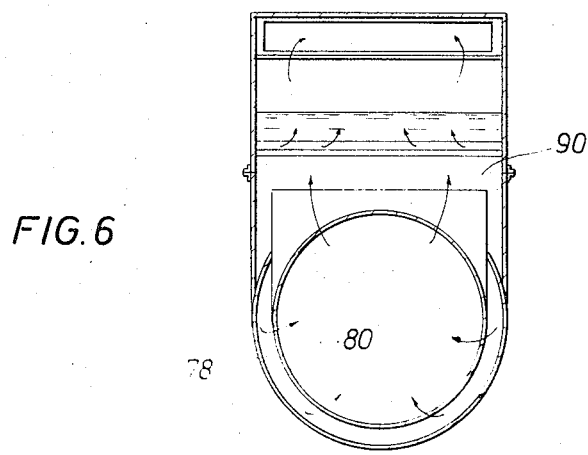
FIG. 6 is a sectional view taken along the line 6 — 6 of FIG. 5 illustrating details of construction of the forced air furnace and fluid bed heat exchanger which are formed together as a single unit.

A substantial volume of air is forced through the duct 26 to the furnace 24. This air is conveyed through a double wall furnace shell better shown in FIG. 6. The outer wall 78 and the inner wall 80 are preferably generally concentrically arranged in communication with the duct 26. This conveys air along the furnace and the air picks up heat which is transferred through the furnace wall 80. It will be observed in FIG. 5 that the furnace is insulated to some extent as indicated by the numeral 82. The concentric or double wall construction is a form of heat exchanger whereby the air is warmed even before it enters the furnace chamber proper, and cools the inner wall 80.

The forwardmost wall 84 of the furnace supports the burner mechanism 28. The burner mechanism includes at one end, an inlet nozzle 86 which is surrounded by an insulated fire box 88. The fire box 88 contains the flame which is formed on combustion of the mixture of air and fuel emerging from the nozzle 86. The fire box 88 is preferably heated to elevated temperatures, even to incandescence, but the air flow past the fire box and through ports entering into the fire box, carries away the heat. Thus, it will be observed that air is introduced from duct 26 and is warmed somewhat as it passes through the double wall passage generally surrounding the furnace. The air is heated even more when it flows past the fire box 88. A portion of the air flows through the fire box and is heated even more. The products of combustion from the fire are drawn off by the air stream which then flows centrally and axially along the furnace chamber proper. All of the heated air is thus carried along the central chamber in the furnace 24 and is exhausted upwardly into a chamber 90 which is at the top side of the furnace and just below the fluid bed heat exchanger.

A partition 92 supports the fluid bed material 94. The partition 92 is formed of a porous member. The porosity is sufficient to permit the hot air to rise upwardly through the partition or plate 92. However, the porous openings are small enough to prevent the fluid bed solids from flowing through into the furnace. The partition 92 supports the fluid bed material on it, functioning somewhat as a grate. The hot air is forced through the openings in the grate and warms the fluid bed material. The particles which comprise the fluid bed are thus elevated substantially in temperature.

Inasmuch as the fluid bed includes millions of small particles, the surface area is quite sizeable. As the mud is sprayed onto the fluid bed, there is more intimate contact between the mud and the fluid bed, achieving a more efficient transfer of heat to the mud. A counterflow of hot air emerging from the fluid bed travels in the opposite direction of the spray. The spray is downwardly directed while the hot air rises upwardly from the surface of the fluid bed. This tends to warm the mud even as it is sprayed from the nozzle. As the mud is sprayed and warmed, the vapor is driven off from the mud and is carried upwardly.

The surface of the fluid bed is in constant agitation and movement. This assists the mud flowing from the vicinity near the spray nozzle 36 to a smaller chamber 96 and then into even a smaller chamber 98. A divider wall 100 is positioned in the chamber 96.

Downwardly directed divider walls 102 and 104 extend into the fluid bed. The walls have doors which open to control the flow of air. The walls 100, 102, and 104 all cooperate with the fluid bed and the flow of air to direct the dried mud to the right as viewed in FIG. 5. The fluid bed is kept in constant agitation, and this, coupled with the influx of hot air emerging from the fluid bed, creates a dynamic situation in which the mud flows generally from the point just below the spray nozzle where it tends to accumulate on introduction to the right hand end in the chamber 98. It will be recalled that the chamber 98 is connected to the funnel 38 which draws off the dried and powdered mud for bagging.

The air which is forced through the porous plate 92 surrenders most of its heat in the dryer 32 and then flows through a passage 108. The air flows through the duct 72 into the centrifugal or cyclone dryers 48.

In operation, the apparatus of the present invention is moved to a remote site, and mud from the mud pit is pumped to the apparatus. The apparatus 14 thus dries the mud, preferably operating in the following manner. The mud is supplied through the pump at the mud pit and is pumped through the pump 54 and the conduit 34 to the spray nozzle 36. Even prior to this, the temperature in the furnace and of the fluid bed is raised to the operating level. The furnace is placed in operation before mud is admitted to the dryer 32. Operation of the furnace requires that both the blower 20 and 22 be operative.

The cyclone separators 48 are operated approximately simultaneous with the introduction of mud to the dryer. Also, the twin screw conveyors 50 are turned on at this point in time.

When mud is first introduced into the dryer 32, some of the water flashes into vapor and a small percentage of the mud is heated sufficiently to be carried away as dust in the air flow. This dust and air flows through the conduit 44 shown in FIG. 2. This conduit connects with the duct 72 which delivered the dust laden air to the cyclone separator 48. The cyclone separator centrifugally separates the dust, causing the dust to collect at the bottom of the cyclone separator and it is supplied by the pipe or conduit 74 into the screw conveyor 50. This transports the dust back into the chamber 98. The dust is returned to the chamber 98 just above the funnel 38 to permit it to be bagged.

While some of the mud is converted into dry dust even before it falls on the fluid bed, the bulk of the mud sprays onto the fluid bed from the spray nozzle and is warmed by the fluid bed. The mud intermingles with the fluid bed and absorbs heat, driving off the water and leaving a dry residue. As the mud is continuously introduced, and as air flows through the fluid bed keeping it in a state of agitation, the mud migrates at or near the top layer of the fluid bed to the right and eventually accumulates in the chamber 98. The particles in the bed are heavier than the mud. In this chamber, the mud is then directed to a position over the funnel 38 and is delivered to the bagging mechanism 40. The mud is bagged and can be handled in the conventional manner.

When mud is first introduced into the fluid bed, very little mud is recovered at the funnel 38. However, after some small time lag, the dried mud has achieved the migration from the point just below the nozzle 36 to the vicinity of the funnel 38. The migration continues indefinitely so long as mud is introduced and even continues after the mud flow from the nozzle 36 has been terminated.

The apparatus of the present invention achieves a substantial reduction in the weight of the mud. If the mud weighs perhaps twelve to sixteen pounds per gallon prior to treatment by the present invention, substantially all of the water can be driven off as water vapor. This reduces the cost of transportation. The mud is then recovered in a dry or powdered form which can be sealed in conventional plastic film, kraft paper sacks, or containers, and it is thereafter handled in the same manner as unused mud. Cloth bag filters are useful as an alternative means of removing dust from the air from the fluid bed, and can be used instead of cyclone separators.

The foregoing is directed to the preferred embodiment of the present invention. The scope is determined by the claims which are appended hereto.

I claim:

1. A device for reclaiming used oilfield drilling mud, comprising:
   a furnace which forms a draft of hot air;
   a fluid bed heat exchanger;
   means for directing a draft of hot air from said furnace into said fluid bed for heating and agitating said fluid bed;
   pump means having an inlet and outlet, said inlet being adapted to be connected to a source of mud to be dried;

sprayer means operatively positioned relative to said fluid bed for spraying mud from said pump means onto said fluid bed for drying the mud;

chamber means cooperating with said fluid bed for containing and limiting the mud treated thereby;

partition means cooperative with said chamber means for separating dried mud from said fluid bed and directing the mud toward an opening for removal;

means for removing air from said fluid bed, said removing means cooperating with said means for directing air and said fluid bed to cause the hot air to heat said fluid bed and surrender heat thereto;

filtration means for removing mud from the air removed by said removing means; and a trailer for supporting the present reclaiming device for mobility and ease of relocation.

2. The apparatus of claim 1 wherein said furnace includes a double wall shell at least partly encircling a portion thereof and said fluid bed is arranged above said furnace, therebeing a porous member therebetween permitting hot air to flow therethrough.

3. The apparatus of claim 1 wherein said filtration means includes a cyclone separator, and including a duct as a portion of said air removing means connected to said separator.

4. The apparatus of claim 1 including an elongate closed housing comprising a portion of said chamber means, said housing including a floor of porous material supporting said fluid bed thereabove, said housing also enclosing said sprayer means.

5. The apparatus of claim 4 including a forced air blower for directing air into said furnace for heating.

6. The apparatus of claim 4 wherein said closed housing is parallel to and above said furnace, and said furnace is horizontally constructed on said trailer.

7. The apparatus of claim 6 wherein furnace and said closed housing are separated by said floor of porous material for directing air into said fluid bed.

8. The apparatus of claim 7 wherein said furnace has a heat exchanger on the air inlet thereof for pre-heating air prior to introduction to said furnace.

* * * * *